United States Patent [19]

Lowell et al.

[11] Patent Number: 4,616,384
[45] Date of Patent: Oct. 14, 1986

[54] FLAG FRAME AND CLAMP

[75] Inventors: Ross Lowell, Pound Ridge, N.Y.; Marvin Seligman, Teaneck, N.J.; Edward Calamai, Pleasantville, N.Y.

[73] Assignee: Lowel-Light Manufacturing, Inc., N.Y.

[21] Appl. No.: 728,156

[22] Filed: Apr. 30, 1985

Related U.S. Application Data

[63] Continuation of Ser. No. 483,488, Apr. 11, 1983, abandoned.

[51] Int. Cl.$^4$ .............................................. A44B 21/00
[52] U.S. Cl. ....................................... 24/335; 24/502; 24/523; 24/525
[58] Field of Search .................. 24/327–329, 24/326, 44, 331–339, 49 CC, 67.5, 67.7, 502–504, 513–516, 535, 536, 568, 569, 523, 525; 248/229, 540, 541, 68 CB; 269/157, 161, 239, 160; 403/146

[56] References Cited

U.S. PATENT DOCUMENTS 233,421 10/1880 Kerper ............................ 24/523 X
2,771,591 11/1956 Vordtreide ...................... 24/335 X
3,177,542 4/1965 James ............................ 24/335 X

FOREIGN PATENT DOCUMENTS 10192 5/1895 Switzerland ...................... 269/160
954405 4/1964 United Kingdom ............ 248/68 CB Primary Examiner—William E. Lyddane
Assistant Examiner—James R. Brittain
Attorney, Agent, or Firm—McGlew and Tuttle

[57] ABSTRACT

A clamp which can be used separately to connect two rod-like members together at any angular relationship, can be used in conjunction with a frame for connecting a frame supporting rod thereof to the rod of a tripod or other rod or post-like member. The clamp comprises two clamp plates pivotally connected to each other with opposite rod engaging ends, and a third plate rotatably mounted to one of the pivotally connected plates. A threaded rod extends through substantially aligned openings in the three plates and can be tightened to squeeze the three plates together. While a first rod-like member can be held between the pivotally connected plates, a second rod-like member can be held between the rotatable plate and the associated one of the pivotally mounted plates.

5 Claims, 10 Drawing Figures

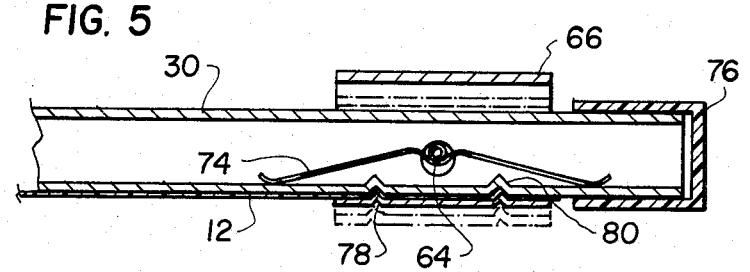
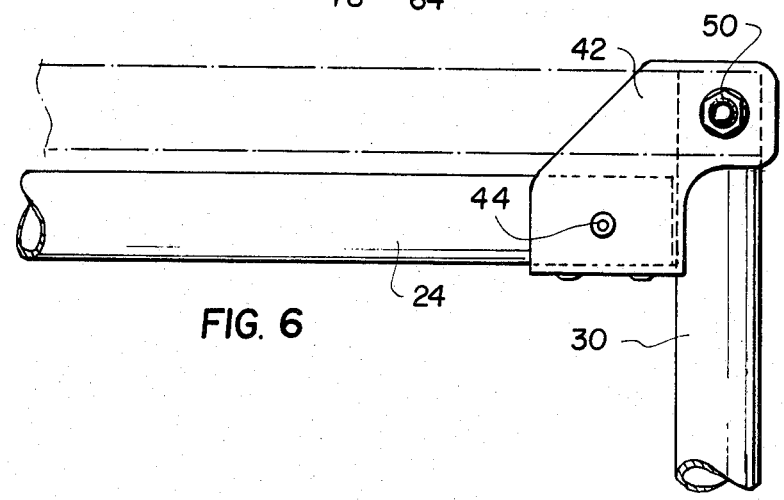
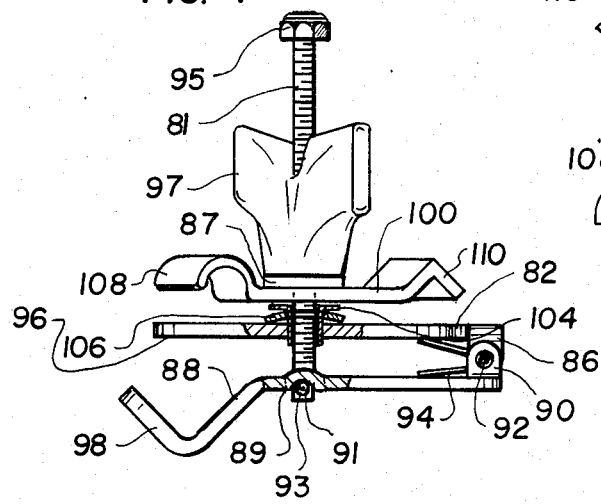
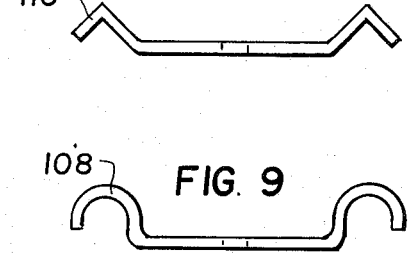

4,616,384

FLAG FRAME AND CLAMP

This application is a continuation of application Ser. No. 483,488, filed Apr. 11, 1983, abandoned.

FIELD AND BACKGROUND OF THE INVENTION

The present invention relates in general to lighting equipment for the photography, movie and video fields, and in particular to a new and useful frame and clamp for supporting light modifying sheets such as flags, scrims, cucolorises and the like.

In the photography, moving picture and video fields, it is known to provide various lighting effects including the blocking of light using black or opaque mats, the reflecting of light using reflecting surfaces, and the softening or scattering of light either by transmission of light through a sheet or selective reflection of light off a sheet. Such sheets are here collectively termed light modifying sheets and include flags, mats, scrims, cutters, cucolorises (for casting shadow patterns) and the like.

It is known to support such sheets in rectangular frames of any desired size. The frames are in general made up of fixedly connected frame elements. The frames are generally difficult to transport in view of their size which can range from 12×18 inches or smaller to 48×48 inches or larger.

The frames usually include at least one limb extending beyond the frame for attachment to tripods or other supporting structures, using clamps of varied design. The clamps are generally complicated in view of the fact that they must provide an arbitrary angular orientation between the frame limb and the tripod or support.

While some folding frames are known, such as those distributed by Lowel-Light Mfg., Inc., there remains room for improvement. The introduction of so-called gels formed in large rectangular sheets and capable of diffusing, coloring, softening or otherwise modifying light, has increased the necessity for a frame structure which is rigid in use yet capable of being folded to a relatively small size. While such gels are extremely flexible in their characteristics, since they are made of flexible plastic-like material, they tend to generate noise when moved by wind. This can obviously cause difficulties when recording sound during movie or video sessions.

In addition to the problem of rigidly supporting such gels or other light modifying sheets, the frames themselves must be rigidly held in fixed orientation with light sources or cameras. While clamps are known for achieving this purpose, they are generally cumbersome in size and complexity.

SUMMARY OF THE INVENTION

The present invention relates to a frame for supporting one or more light modifying sheets and a clamp for connecting the frame to any rod-like or post-like member at a totally arbitrary angular relationship with the member.

Accordingly, an object of the present invention is to provide a frame for supporting at least light modifying sheet which comprises a main rod, a first hinge connected to the main rod near one end thereof, a second hinge connected to the main rod near an opposite end thereof, a third hinge connected to the main rod at a location thereon intermediate the one and opposite ends, a frame support rod connected to the third hinge and a sheet support rod connected each of the first and second hinges. Each of the sheet support rods includes at least one clip means for holding opposite sides of a sheet between the sheet support rods.

Another object of the invention is to provide a clamp for clamping at least two rod-like or post-like members together, at any angular relationship, which can be used with the frame or alone, and which comprises a first clamp plate, a second clamp plate pivotally connected to the first clamp plate about a first axis, the first and second clamp plates having juxtaposable engaging portions spaced from the pivotal connection between the plates for holding a rod-like or post-like member therebetween, a third clamp plate rotatably mounted about a second axis to the first clamp plate on a side thereof opposite the second clamp plate, the second axis being at an angle and preferably perpendicular to the first axis with pressing means connected to the first, second and third clamp plates for pressing the first and second clamp plates together to hold a first member therebetween and for pressing the third clamp member against the first clamp member for holding a second member therebetween.

A further object of the invention is to provide such a frame clamp which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a side sectional view of the clip means;

FIG. 6 is a top plan view of the hinge area;

FIG. 7 is a side elevational view of the inventive clamp;

FIG. 8 is a sectional view of another embodiment of the third clamp plate used in the clamp of FIG. 7;

FIG. 9 is a view similar to FIG. 8 of a further embodiment of the third clamp plate.

DESCRIPTION OF THE PREFERRED EMBODIMENTS

Figure 1:
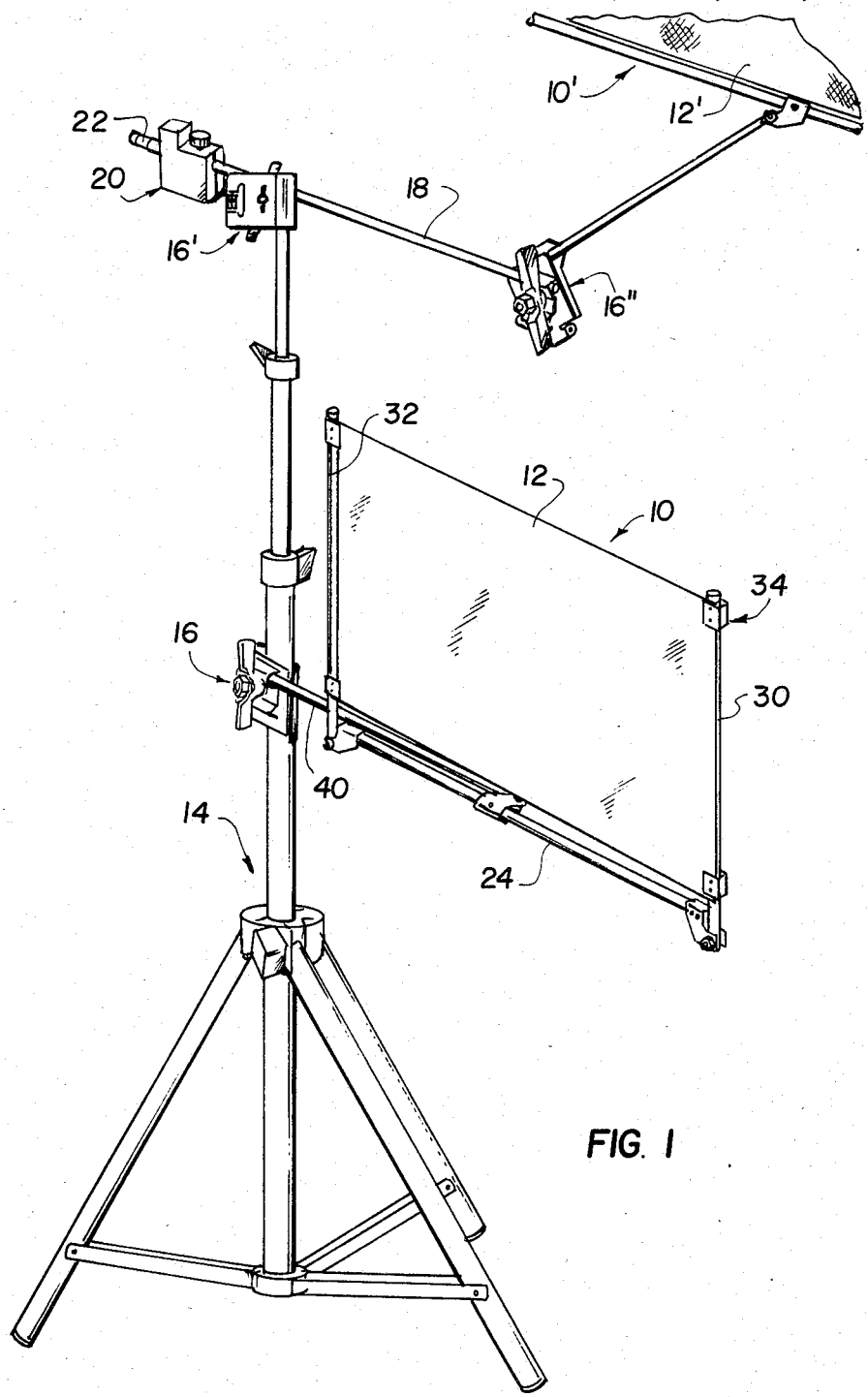
FIG. 1 is a perspective view showing the frames and clamps of the invention associated with a tripod of known design.

Referring to the drawings in particular the invention embodied therein, in FIG. 1, comprises a frame generally designated 10 for supporting one or more light modifying sheets 12. Frame 10 is shown connected to a tripod 14 of known design, by a clamp 16, constructed in accordance with the invention. FIG. 1 illustrates how an additional clamp 16' can be utilized to engage the top post-like end of tripod 14 (or any other post-like member) to support an additional frame 10' (shown in part) carrying an additional light modifying sheet 12'. Frame 10' is supported through an additional clamp 16" and over an extension rod 18. To compensate for the weight of clamp 16", frame 10' and sheet 12', a counterweight 20 is provided on an opposite end of rod 18. Weight 20 is of known design and includes an end post 22 commonly referred to as a stud and having a recessed step area for connecting additional counterweights 20. In similar fashion, rod 18 includes a stud end (not shown) which is engaged by counterweight 20.

Extension rod 18 can be utilized to orient frame 10' is a desired position around a light or camera supported by tripod 14 or some other mounting arrangement.

Each clamp 16,16' and 16" is capable, as will be discussed in greater detail hereinunder, of connecting two rod or post-like members together at any angular relationship.

Figure 2:
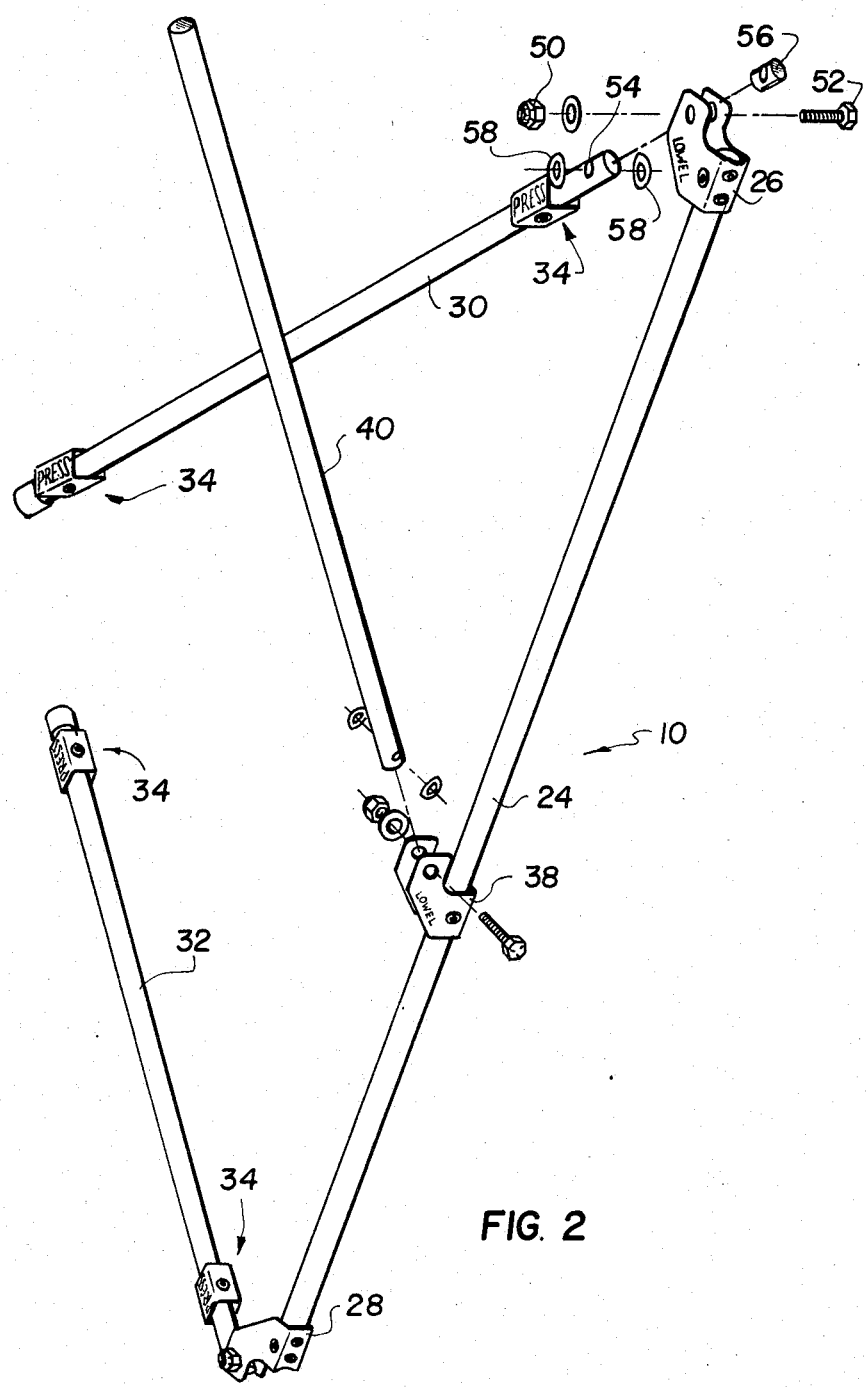
FIG. 2 is an exploded perspective view of the inventive frame for supporting one or more light modifying sheets.
Figure 3:
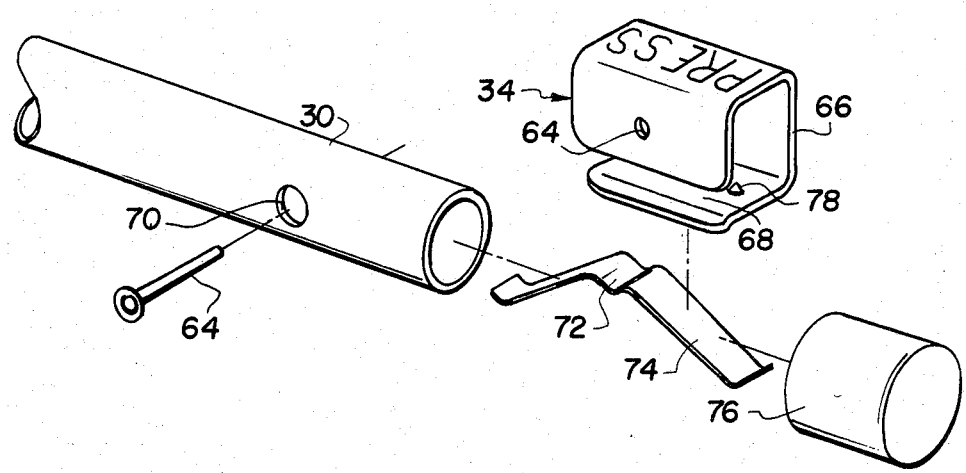
FIG. 3 is an exploded perspective view of clip means for releasably clipping a light modifying sheet to a frame member of the inventive frame.
Figure 4:
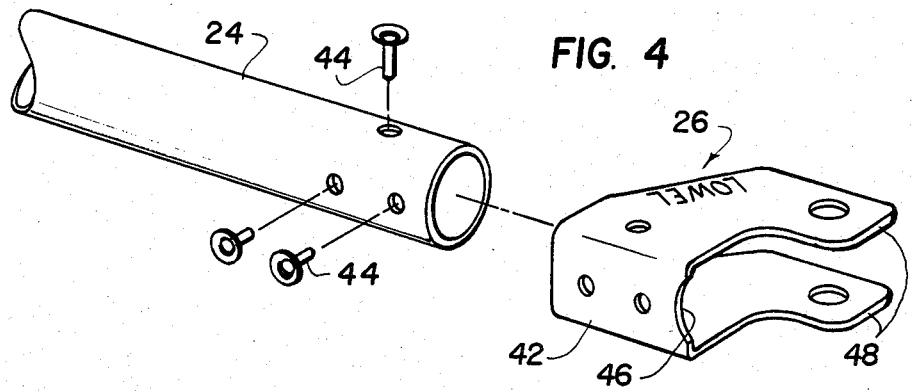
FIG. 4 is an exploded view of a hinge for pivotally connecting frame members together in the inventive frame.
Figure 10:
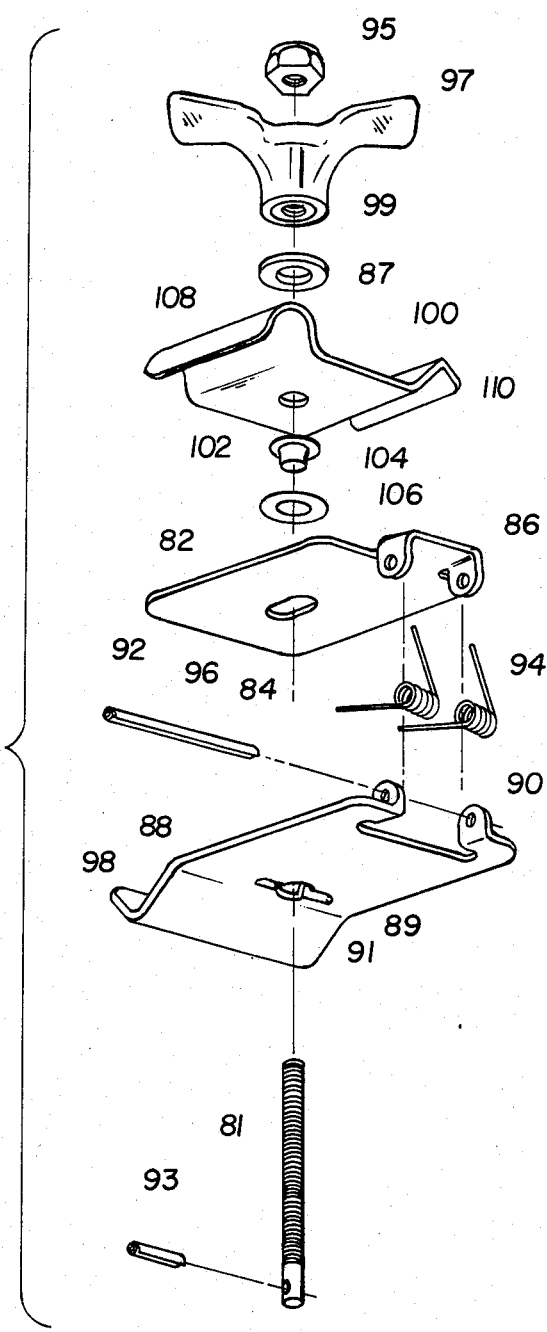
FIG. 10 is an exploded perspective view of the clamp according to the invention.

As shown in FIG. 2, frame 10 comprises a main rod 24 having a first hinge 26 at one end thereof and a second hinge 28 at an opposite end thereof. Sheet support rods 30 and 32 are pivotally connected to main rod 24 over hinges 26 and 28 respectively. Each sheet support rod 30,32 includes at least one and preferably two widely spaced clip means generally designated 34. Additional details of this structure are shown in FIGS. 3 and 5.

Each clip means is capable of resiliently holding sheet material adjacent an edge thereof so a sheet can be stretched and held between the rods 30, 32 when they are in their upright or erected positions as they are shown in FIG. 1.

A third hinge 38 is connected at an intermediate location on main rod 24, and pivotally receives a frame support rod 40. To facilitate the folding of frame 10 into a small convenient package, hinge 38 is connected off center to rod 24. The length of rod 24 above hinge 38 as shown in FIG. 2 is approximately equal to the length of support rod 40 so that, in a folded position with rod 40 parallel to rod 24, the upper end of rod 40 lies next to the upper end of rod 24. Rod 40 is longer than the lower end of rod 24 as shown in FIG. 2 so that in an opposite position, the end of rod 40 extends beyond the lower end of rod 24. As shown in FIG. 1, this permits access to the end of rod 40. Rod 24 can of course be pivoted to any desired position with respect to rod 40 to properly angle the sheet 12.

Rods 30 and 32 are also advantageously at most the same length of rod 24 and preferably smaller than this length to permit compact storage of the folded frame 10.

Rods 24, 30, 32 and 40 are all advantageously made of light weight and strong aluminum alloy which is black anodized to prevent corrosion and glare. In a similar fashion the hinges and clip means are all black cadmium plated. For strength however, these elements are made of steel.

In the preferred form of the invention as shown in FIGS. 2 and 6, sheet support rods 30 are pivotable in a common plane about the ends of main rod 24. Each hinge 26, 28 comprises a bracket 42 which is connected to an end of rod 24 by pop rivets 44. Bracket 42 includes a curved stop surface 46 so that, in an erected position as shown in FIG. 6, the sheet support rods 30 or 32 are held exactly perpendicular to the main rod 24. Any other desired angular orientation between the rods is possible depending on specific requirements. Bracket 42 is also shaped with wings 48 so that sheet support rods 30 or 32, in their folded position shown in dot dashed line in FIG. 6, lie parallel to main rod 24. Rods 30 and 32 are connected to the respective hinges by a bolt 52 and nut 50. Bolt 52 extends through an opening 54 in the end of rod 30 which is provided with a plug 56 having an aligned opening for strength. Spring washers 58 are provided on opposite sides of the end of rod 30 and between wings 48 of bracket 42 to establish frictional engagement between the bracket and rod. This avoids undesired movement of the frame elements.

One end of frame support rod 40 is connected in a similar fashion, and with a similar frictional engagement to main rod 24 by hinge 38. The frictional engagement is here even more important to hold the orientation of main rod 24 with respect to frame support rod 40 when the frame is in use.

It is noted that to permit as flexible an orientation as possible, rod 40 is pivoted about an axis which lies in the plane of motion of rods 30 and 32. That is the rods 30 and 32 are pivoted about a perpendicular axis to that of rod 40, with respect to main rod 24.

As shown in FIG. 3, clip means 34 includes a clip member 66 having four sides defining a slit opening 68. Aligned through openings 64 receive a rivet 62 which passes through larger openings 70 in sheet support rod 30. This permits relative movement between member 66 and rod 30. Rivet 62 also bears against an upper valley 72 of leaf spring 74. A plastic cap 76, which is also black as all the other parts of the invention, is fitted over the end of rod 30 for safety.

As shown in FIG. 5, to engage an edge of sheet 12, member 66 can be moved downwardly (into its dot dash position) against the upward bias of spring 74. This exposes slot 68 which can then receive a sheet edge. The lower side of member 66 is provided with two dimples 78 which mate with aligned with dimples 80 in the end of rod 30 to more positively engage the sheet 12.

The clamp of the invention is shown in FIGS. 7 through 10. It comprises a first clamp plate 82 having opposite flat sides, an elongated opening 84 therein and ears 86 which form part of a hinge with a second clamp plate 88. The hinge includes ears 90 which have openings that align with the openings of ears 86 and receive a spiral spring pin 92. The ends of pin 92 firmly engage the openings of ears 90 and are loosely received in the openings of ears 86 to permit relative pivotal movement between plates 82 and 88 about a first axis extending through pin 92. Springs 94 are provided between plates 82 and 88 and on pin 92 to bias the plates outwardly away from each other. The plates include elongated engaging portions 96, 98 which define surfaces which are capable of holding a rod-like or post-like member between plates 82,88. Engaging portion 98 is concavely prifiled toward plate 82. While the engaging portion 98 of plate 88 is shown to have flat angled sides, the cross sectional shape can be modified in any desired way to engage a rod or post having any arbitrary cross sectional shape.

Plate 88 includes an opening 89 therethrough with short recesses 91 communicating with opening 89. Recesses 91 engage spiral spring pin 93 which is press fit into a lower opening of threaded rod 81 to form a T which engages opening 89 and recesses 91 and prevents relative rotation between threaded rod 81 and plate 88. Rod 81 can pivot a small amount, however with respect to plate 88 due to the elongated or enlarged nature of slot 84.

Threaded rod 81 extends through elongated slot 84 and through an opening 102 in a third clamp plate 100. In this way, third clamp plate 100 is rotatably mounted on a side of first clamp plate 82 opposite from second clamp plate 88. Plate 100 is held resiliently away from an upper surface of plate 82 by brass sleeve 104 and spring washer 106 which is slightly bent.

Third clamp plate 100 includes opposite rod-like or post-like member engaging portions 108, 110 which are elongated and concavely profiled in a direction facing the first plate 82. A lock nut 95 is connected to the top of threaded rod 81. A knob 97 made of hard plastic and having a threaded brass insert 99 is threaded to rod 81. Knob 97 can be threaded down on an anti-friction washer 87 to press plates 100, 82 and 88 together. In this way, a first elongated rod-like or post-like member held between the upper surface of plate 82 and one of the engaging ends 108, 110 of plate 100 can be held and a second member can be held between the engaging portions 96 and 98 of plates 82 and 88. As shown in FIGS. 8 and 9, the shape of engaging portions 108 and 110 can be selected to achieve any desired purpose or adapt to any cross sectional shape or size of a rod member. Plate 100 may also be provided with only one engaging portion or more than two engaging portions (for example, on two additional sides thereof). According to one form of the invention, the engaging portion 108 is curved and has a radius matching the radius of rod 40 to act as a lock to further prevent relative rotation between rod 40 and the clamp structure.

It is noted that the axis of rotation of plate 100 is at an angle to that of pin 92, and preferably perpendicular thereto. In this way any desired angular orientation between the members held in the two clamped portions can be achieved.

Also, while threaded rod 81 with knob 97 is shown as pressing means for pressing the clamp members together, different means can be provided for achieving this purpose which do not necessarily call for the simultaneous clamping of all three plates together.

While specific embodiments of the invention have been shown and described in detail to illustrate the application of the principles of the invention, it will be understood that the invention may be embodied otherwise without departing from such principles.

What is claimed is:

1. A clamp assembly for clamping together rod-like members of photographic equipment at any angular relationship, comprising a first clamp plate having opposite flat sides and a substantially central opening therethrough, a second clamp plate pivotally connected to said first clamp plate at a pivotal connection, said first and second clamp plates having juxtaposable engaging portions spaced from said pivotal connection for holding a rod-like member therebetween, said engaging portion of said first clamp plate defined on one of said flat sides and said engaging portion of said second clamp plate having an elongated profiled concave cross-section facing said first clamp plate, a third clamp plate having a substantially central opening aligned with said opening of said first clamp plate and mounted for rotation on said first clamp plate on a side of said first clamp plate facing away from said second clamp plate, a threaded presser rod extending through said aligned openings of said first and third clamp plates, said threaded presser rod being freely rotatable and freely axially movable with respect to said aligned openings, means engaged between said presser rod and said second clamp plate for establishing a fixed rotational position between said presser rod and said second clamp plate and for permitting pivotal motion between said second clamp plate and said presser rod, a knob threadably engaged on said presser rod and movable into a fixed position on said presser rod against said third clamp plate on a side of said third clamp plate away from said first and second plates, to simultaneously press said first, second and third clamp plates together for pressing said engaging portions of said first and second clamp plates together and for pressing engaging portions of said third clamp plate toward the other of said flat sides of said first clamp plate, said third clamp plate being mounted for rotation about said presser rod and including a pair of elongated concave engaging portions on opposite sides of said presser rod respectively, each of said engaging portions having an elongated profiled concave cross-section facing said first clamp plate for clamping an elongated member between said first and third clamp plates in any rotational position of said third clamp plate and the elongated member with respect to said first clamp plate, said first and second clamp plates being pivotally mounted to each other about a first axis, said threaded presser rod extends in a second axis which is orthogonal to said first axis, first spring means connected between said first and second clamp plates adjacent said pivotal connection for biasing said juxtaposable engaging portions of said first and second clamp plates away from each other, and second spring means engaged between said first and third clamp plates for biasing said first and third clamp plates apart so as to aid in unclamping an elongated member from between said third and first clamp plates.

2. A clamp assembly according to claim 1, wherein said pivotal connection comprises a pair of ears extending from said first clamp plate and a pair of ears extending from said second clamp plate, said ears all having aligned through openings, a pin extending through said aligned through openings of said ears and a spring engaged on said pin and engaged against facing surfaces of said first and second clamp plates for biasing said engaging portions of said first and second plates apart.

3. A clamp assembly according to claim 1, wherein each of said first and second plates including a pair of apertured ears with apertures of said ears being aligned and receiving a pin for forming said pivotal connection between said first and second clamp plates, at least one spring engaged on said pin for biasing said engaging portions of said first and second clamp plates apart, said second clamp plate including at least one recess communicating with the through opening of said second clamp plate, said threaded rod including a pin extending therethrough at an end thereof adjacent said second clamp plate, said pin of said threaded rod engaged in said recess for preventing relative rotation of said threaded rod and said second clamp plate.

4. A clamp assembly according to claim 1, wherein said engaging portion of said second clamp plate is V-shaped, one of said pair of engaging portions of said third plate being V-shaped and the other of said pair of engaging portions of said third plate being semi-circular.

5. A clamp assembly according to claim 1, wherein said pivotal connection comprises a pair of ears connected to each of said first and second clamp plates each having an opening therethrough and a pivot pin connected through said openings of said ears, said first spring means comprising at least one helical spring having legs engaged with said first and second clamp plates and engaged around said pivot pin, said second spring means comprising a spring washer engaged around said threaded presser rod and between said first and third clamp plates.

* * * * *